United States Patent
Salter et al.

(10) Patent No.: US 10,240,542 B1
(45) Date of Patent: Mar. 26, 2019

(54) METHODS AND SYSTEMS FOR FUEL SYSTEM MONITORING

(71) Applicant: Ford Global Technologies, LLC, Dearborn, MI (US)

(72) Inventors: Stuart C. Salter, White Lake, MI (US); Annette Lynn Huebner, White Lake, MI (US); James J. Surman, Clinton Township, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/818,643

(22) Filed: Nov. 20, 2017

(51) Int. Cl.
| | |
|---|---|
| *F02D 41/22* | (2006.01) |
| *F02D 41/04* | (2006.01) |
| *B60N 2/00* | (2006.01) |
| *F02N 11/08* | (2006.01) |
| *B60K 15/05* | (2006.01) |
| *B60K 15/03* | (2006.01) |

(52) U.S. Cl.
CPC .......... *F02D 41/042* (2013.01); *B60K 15/05* (2013.01); *B60N 2/002* (2013.01); *F02N 11/08* (2013.01); *B60K 2015/0323* (2013.01); *B60K 2015/03203* (2013.01); *B60K 2015/03217* (2013.01); *B60K 2015/03368* (2013.01); *B60K 2015/0546* (2013.01); *B60K 2015/0553* (2013.01)

(58) Field of Classification Search
CPC ....... F02D 41/042; F02N 11/08; B60K 15/05; B60K 2015/0553; B60K 2015/0323; B60K 2015/03217; B60K 2015/03203; B60K 2015/03368; B60K 2015/0546; B60N 2/002; B60Q 1/14; B60Q 1/50; B60Q 2400/10

USPC ................ 123/179.3, 179.4, 198 D, 198 DC; 141/348, 349, 350; 220/86.1, 86.2, 86.3; 362/459

See application file for complete search history.

(56) References Cited

U.S. PATENT DOCUMENTS

| | | | |
|---|---|---|---|
| 5,329,164 A | 7/1994 | Saito | |
| 5,720,327 A | 2/1998 | Foster, Jr. | |
| 6,712,171 B2 * | 3/2004 | Farmer | B60K 15/05 180/271 |
| 6,990,945 B1 * | 1/2006 | Kropinski | F02D 41/042 123/198 D |
| 7,377,253 B2 * | 5/2008 | Washeleski | B60K 15/03504 123/198 D |
| 8,539,993 B2 | 9/2013 | Hagano | |
| 8,844,587 B1 * | 9/2014 | McCommons | B67D 7/42 141/207 |
| 9,181,880 B2 * | 11/2015 | Sloan | F02D 17/04 |

(Continued)

FOREIGN PATENT DOCUMENTS

EP 2436548 A1 4/2012

*Primary Examiner* — Hai H Huynh
(74) *Attorney, Agent, or Firm* — Julia Voutyras; McCoy Russell LLP

(57) ABSTRACT

Methods and systems are provided for detecting a fuel dispensing nozzle coupled to a fuel tank of a vehicle and providing a visual indication of the presence of the fuel dispensing nozzle to a vehicle operator. In one example, a method may include detecting the fuel dispensing nozzle within the fuel tank and illuminating a portion of a fuel tank access region. Further, vehicle operation may be adjusted based on the detection, and one or more alerts may be communicated to the vehicle operator.

20 Claims, 8 Drawing Sheets

FUEL TANK ACCESS PANEL IN OPEN POSITION

(56) References Cited

U.S. PATENT DOCUMENTS

| | | | |
|---|---|---|---|
| 9,457,651 B2* | 10/2016 | Lindlbauer | B60K 15/05 |
| 9,533,613 B2 | 1/2017 | Salter et al. | |
| 9,650,235 B2* | 5/2017 | Braden | B67D 7/34 |
| 9,938,951 B1* | 4/2018 | Ghannam | H05K 999/99 |
| 2003/0062210 A1 | 4/2003 | Farmer | |
| 2010/0246198 A1* | 9/2010 | Hook | B60L 11/1818 |
| | | | 362/459 |
| 2013/0278402 A1* | 10/2013 | Rothschild | B60Q 1/50 |
| | | | 340/425.5 |
| 2015/0138811 A1 | 5/2015 | Salter et al. | |

* cited by examiner

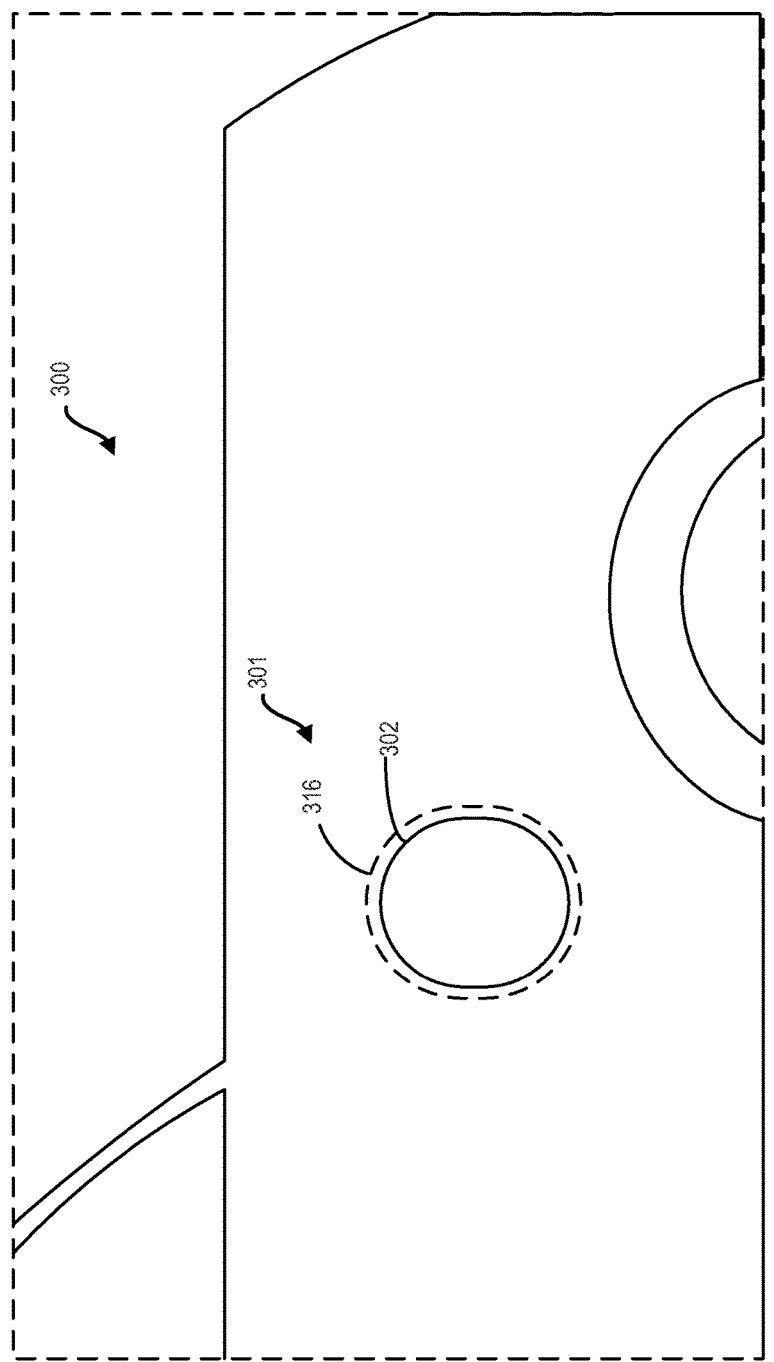

FUEL TANK ACCESS PANEL IN OPEN POSITION

METHODS AND SYSTEMS FOR FUEL SYSTEM MONITORING

FIELD

The present description relates generally to methods and systems for illuminating a portion of a vehicle based on fuel tank conditions.

BACKGROUND/SUMMARY

Vehicle fuel systems include fuel tanks for storing fuel. Fuel tanks may be periodically refilled by a vehicle operator or a user via a fuel dispensing pump in a fuel station. Fuel dispensing pumps include a fuel dispensing nozzle for delivering fuel into the fuel tank. Typically, during a refueling operation, the fuel dispensing nozzle is inserted into a fuel filler pipe via a fuel tank inlet, and fuel is pumped into the fuel tank via the fuel dispensing nozzle. In order to access the fuel tank inlet, a fuel tank access panel shielding the fuel tank inlet may be opened.

After refueling is complete, fuel dispensing nozzle is returned to the fuel dispensing pump and the fuel tank access panel is closed. However, some vehicle operators may not disengage a fuel nozzle from the fuel tank, and may attempt to drive with the fuel nozzle coupled to the fuel filler, resulting in damage to the fuel filler and/or dispensing nozzle, fuel spillage, and escape of fuel vapors.

In one example, the above-mentioned issues may be at least partly addressed by a method for a vehicle, comprising: in response to detecting, with a transmitter and a first receiver of a sensor, a fuel dispensing nozzle within a vehicle fuel tank, illuminating a first portion of a fuel tank access region disposed in the vehicle; and in response to detecting, with the transmitter and a second receiver of the sensor, a fuel tank access panel in an open position, illuminating a second portion of the fuel tank access region. In this way, a sensor subsystem including a transmitter, a first receiver, and a second receiver may be utilized to detect an open position of the fuel tank access panel while detecting the presence of the fuel dispensing nozzle within the fuel tank. Further, one or more portions of the fuel tank access region on the vehicle may be illuminated based on the detections to provide a visual indication of the presence of the fuel dispensing nozzle within the fuel tank.

For example, in response to detecting the presence of the fuel dispensing nozzle within the fuel tank, a first portion around a perimeter of a fuel tank inlet may be illuminated by a lighting system of the vehicle. Further, the presence of nozzle within the fuel tank inlet may be communicated to the vehicle operator via a message transmitted to a mobile phone of the operator via a wireless communication. Furthermore, engine operation may be stopped and may be maintained in the stopped state until the fuel nozzle is removed. In this way, the vehicle operator may be alerted regarding the presence of the fuel dispensing nozzle within the fuel tank, and vehicle operation may be adjusted to prevent operator from driving off with the fuel dispensing nozzle engaged with the fuel tank. Furthermore, the sensor sub-system may be used in combination with one or more additional sensors, such as a driver seat occupation sensor, fuel level sensor, gear position sensor, and indications from sensors of the external fuel dispensing pump, such as dispensing pump fuel flow sensor, to provide additional messages to the vehicle operator via a vehicle display and/or mobile phone, to alert the vehicle operator regarding fuel tank conditions before, during, and after refueling.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically shows an example vehicle propulsion system.

FIG. 2 schematically shows another example vehicle system with a fuel system and an emissions control system.

FIG. 3A schematically shows a portion of an exterior of an example vehicle system including a fuel tank access panel in a closed position and including a fuel tank access region.

FIG. 3B schematically shows the fuel tank access panel in an open position including lighting and sensor sub-systems within the access panel.

DETAILED DESCRIPTION

Figure 1:
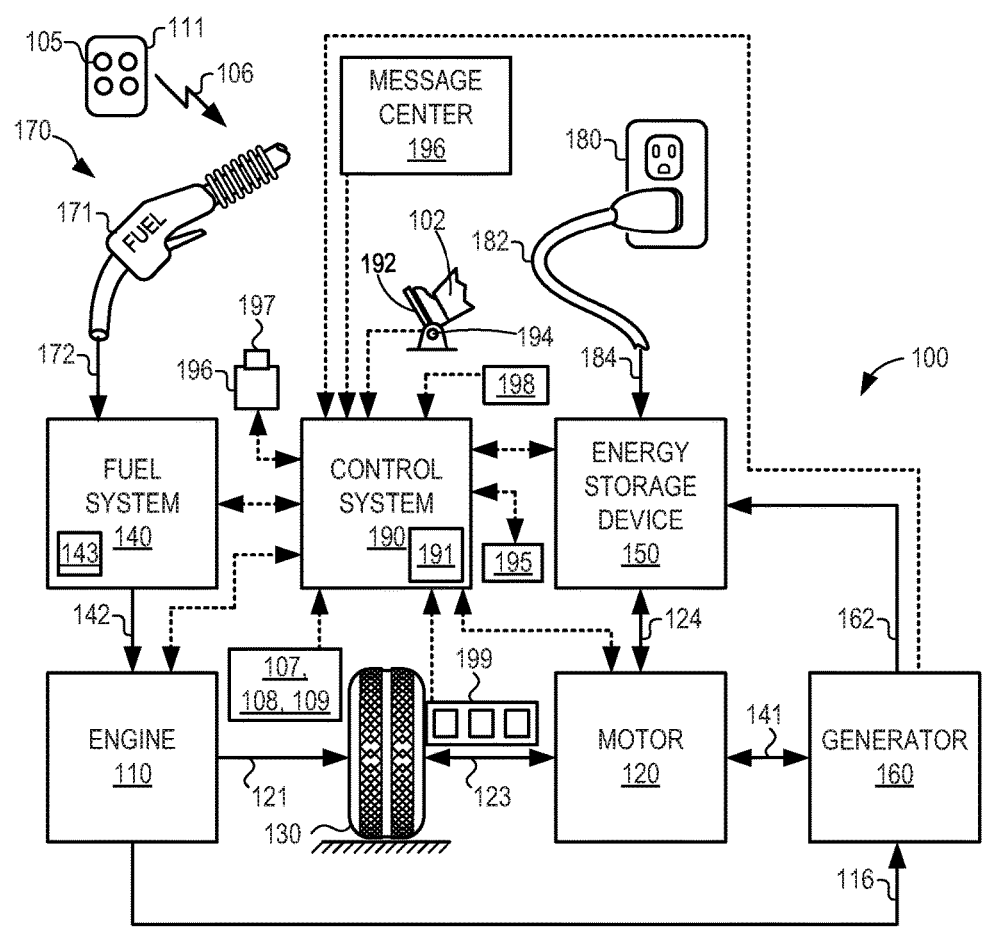
Figure 2:
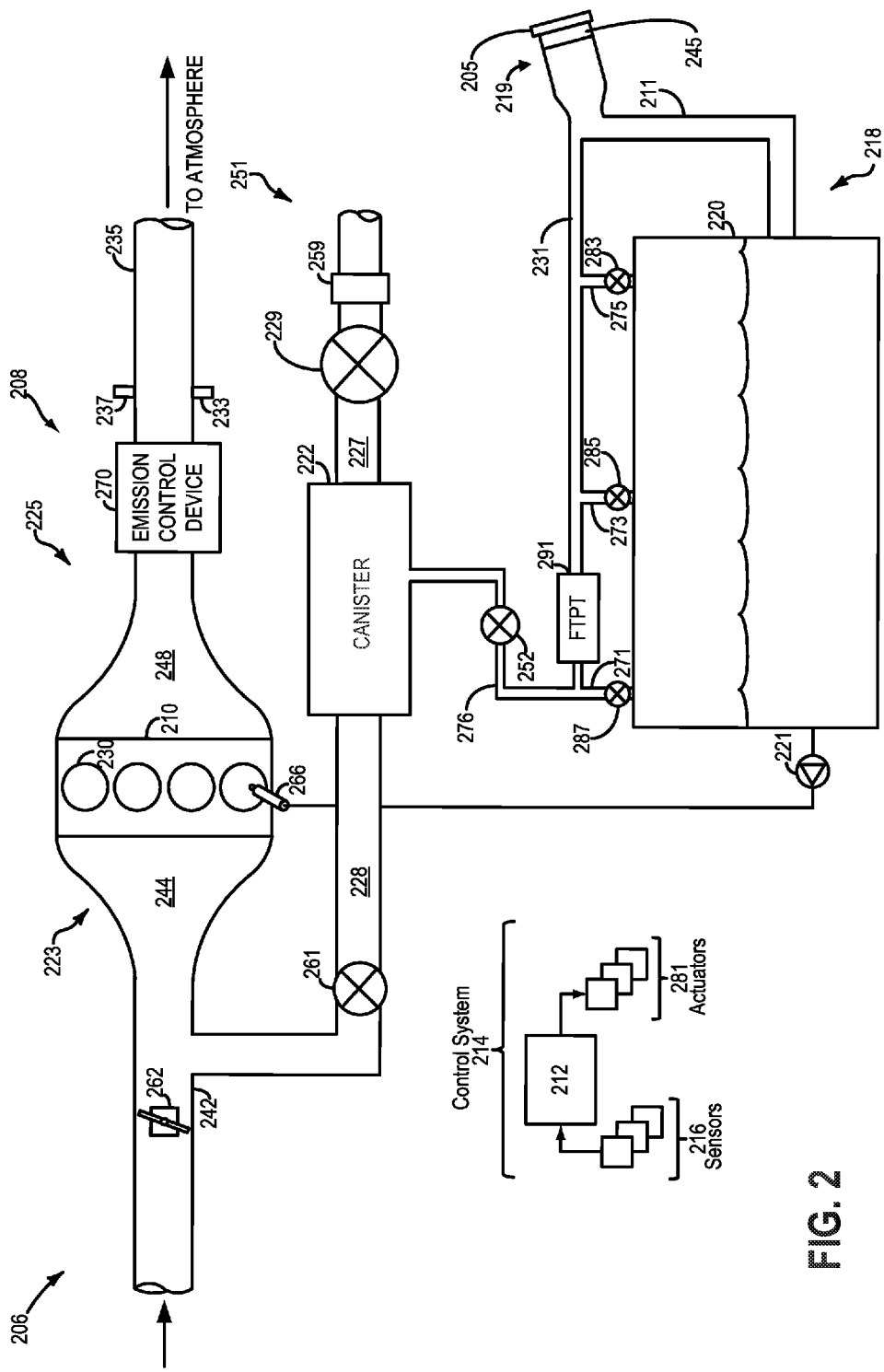
Figure 3B:
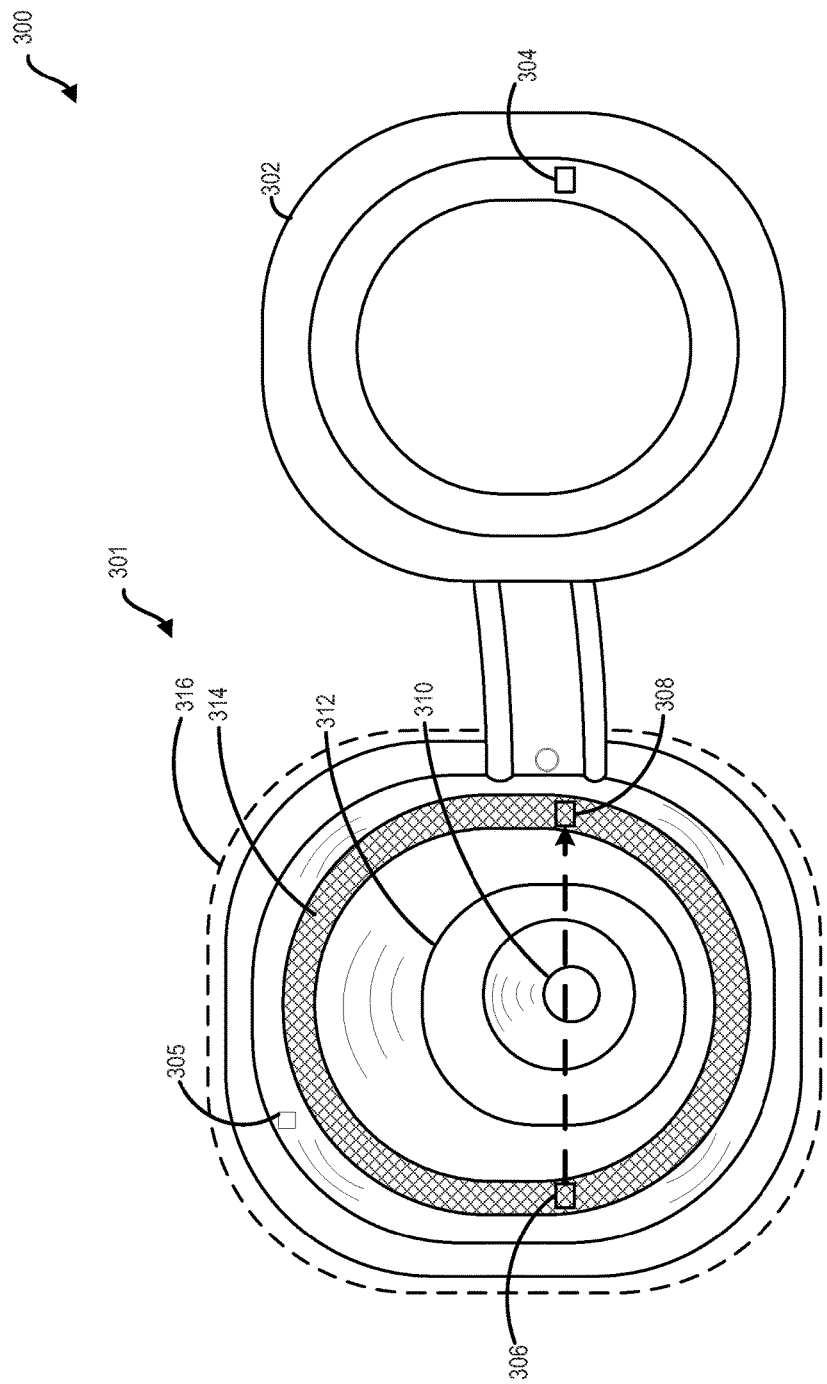

The following description relates to systems and methods for operating a vehicle, such as the vehicle shown in FIG. 1, including adjusting engine operation and illuminating one or more portions of a fuel tank access region, based on one or more of the fuel dispensing nozzle engaged with a fuel tank of the vehicle and a position of a fuel tank access panel of the vehicle. Another example vehicle system including a fuel system and an engine system is shown in FIG. 2. A vehicle controller may illuminate one or more portions of the fuel tank access region as shown in FIGS. 3A and 3B based on output from a sensor subsystem, also shown in FIGS. 3A and 3B, configured to detect when the fuel dispensing nozzle is engaged with the fuel tank while detecting an open position of the fuel tank access panel. A vehicle network including the sensor and the lighting sub-systems is further illustrated in FIG. 4. Further, a vehicle controller may be configured to perform control routines, such as the example routines of FIGS. 5A, 5B, and 6 to adjust vehicle operation, illuminate one or more portions of the fuel tank access region, and to alert the vehicle operator based on detecting the fuel dispensing nozzle and the position of the fuel tank access panel with the sensor sub-system, which may be used in combination with one or more additional sensor such a fuel level sensor, a driver seat occupation sensor, etc. To provide additional alerts to the vehicle operator.

FIG. 1 illustrates an example vehicle propulsion system 100. Vehicle propulsion system 100 includes a fuel burning engine 110 and a motor 120. While the vehicle propulsion system 100 illustrated in FIG. 1 is a hybrid-propulsion system, it will be appreciated that the embodiments described herein, including the methods described with respect to FIGS. 5A, 5B, and are also applicable to vehicle propulsion systems that are solely driven by an engine and are configured with autonomous driving capability.

As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. Set to a deactivated state) where combustion of fuel at the engine is discontinued. For example, under select operating conditions, motor 120 may propel the vehicle via drive wheel 130 as indicated by arrow 123 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 121 while motor 120 is deactivated. During other operating conditions, both engine 110 and motor 120 may each be operated to propel the vehicle via drive wheel 130 as indicated by arrows 121 and 123, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 123. For example, during select operating conditions, engine 110 may drive generator 160, as indicated by arrow 116, which may in turn supply electrical energy to one or more of motor 120 as indicated by arrow 141 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 143 for storing fuel on-board the vehicle. For example, fuel tank 143 may store one or more liquid fuels, including but not limited to: gasoline, diesel, and alcohol fuels. In some examples, the fuel may be stored on-board the vehicle as a blend of two or more different fuels. For example, fuel tank 143 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 121 or to recharge energy storage device 150 via motor 120 or generator 160.

Fuel system 140 may periodically receive fuel from a fuel source residing external to the vehicle, such as a fuel dispenser pump (not shown) located in a fuel station (not shown). As a non-limiting example, vehicle propulsion system 100 may be refueled by receiving fuel via a fuel dispensing device 170 as indicated by arrow 172. The fuel dispensing device 170 may include a fuel nozzle 171. The fuel dispensing device 170 may be coupled to the fuel dispenser pump via a flexible hose (not shown) attached to the nozzle 171. Fuel tank 143 may include a fuel tank inlet, which may be accessible from an exterior of vehicle via a fuel tank access panel. For example, during refueling, the fuel tank access panel may be opened, and subsequently, fuel nozzle 171 may be placed into the inlet of fuel tank 143. When refueling is completed, fuel nozzle 171 may be removed from the inlet, and the fuel tank access panel may be closed. However, during vehicle operating conditions when refueling is in progress or after refueling is completed, a vehicle operator may attempt to drive without removing the nozzle from the fuel tank inlet. As such, fuel system 140 may include a sensor sub-system that is configured to detect the presence of nozzle within the fuel tank inlet (that is detect nozzle coupled to the fuel tank inlet) while detecting a position of the fuel tank access panel. The sensor sub-system may include a transmitter, a first receiver, and a second receiver arranged within a fuel tank access region of the vehicle, the fuel tank access region including the fuel tank access panel. Specifically, the transmitter and the first receiver may be arranged on opposite sides of the fuel tank inlet such that a portion of light rays (e.g., infra red rays when the transmitter is an infra red transmitter) from the transmitter travels along a diameter of the fuel tank inlet before reaching the first receiver. When the fuel nozzle is coupled to the fuel tank inlet, the portion of light rays are interrupted by the nozzle and thus, presence of fuel nozzle may be sensed based on interruption of the light rays sensed by the first receiver. Thus, a fuel dispensing nozzle sensor may include the transmitter and the first receiver arranged on opposite sides of the fuel tank inlet in the fuel tank access region.

Further, the second receiver may be positioned on an inner surface of the fuel tank access panel such that when the fuel tank access panel is in a closed position, the second receiver may sense a second portion of light rays transmitted at right angles to the portion of light rays. Thus, an open condition of the fuel tank access panel may be detected based on sensing interruption of the second portion of light rays from the transmitter. Thus, a fuel tank access panel sensor may include the transmitter and the second receiver. Details of the sensor sub-system including the fuel dispensing nozzle sensor and the fuel tank access panel sensor will be further elaborated with respect to FIGS. 3A and 3B. In this way, a sensor sub-system arranged within the fuel tank access region may be utilized to to detect one or more of a fuel tank access panel open condition, and a fuel dispensing nozzle inserted within the fuel tank inlet condition. Specifically, the sensor sub-system may detect presence of a fuel dispensing nozzle coupled to the fuel tank while detecting a position of the fuel tank access door. An example illustration of the fuel tank access panel in a closed position is shown at FIG. 3A, and an example illustration of the fuel tank access panel in an open position is shown at FIG. 3B.

The sensor sub-system may be operated in coordination with a lighting sub-system. The lighting sub-system may also be referred to herein as the lighting system. The lighting system may be configured to provide a visual indication to the operator outside the vehicle. For example, the lighting system may be configured to illuminate one or more of a first portion of the fuel tank access region surrounding the fuel tank inlet, and a second portion of the fuel tank access region surrounding the fuel tank access panel based on one or more of a fuel nozzle inserted condition and a fuel tank access panel open condition. For example, in response to detecting the presence of the nozzle, the lighting system may be configured to illuminate the first portion of the fuel tank access region. The illumination may be continuous or periodic to indicate the presence of the nozzle in the fuel inlet. Additionally or alternatively, in response to detecting the presence of the nozzle, a vehicle controller may provide a message to a display within the vehicle to alert the presence of nozzle within the fuel tank inlet. The display may be included in a human-machine interface of the vehicle, for example. Furthermore, in response detecting the fuel nozzle inserted condition, vehicle operation may be adjusted to stop engine running, and delay further engine start until the nozzle is removed.

Further, in response to detecting the fuel access panel in the open condition, the lighting system may illuminate the second portion of the fuel tank access region. Additionally or alternatively, in response to detecting the fuel tank access panel in the open position, the vehicle controller may provide a message to the display within the vehicle to alert the presence of nozzle within the fuel tank inlet.

Figure 5A:
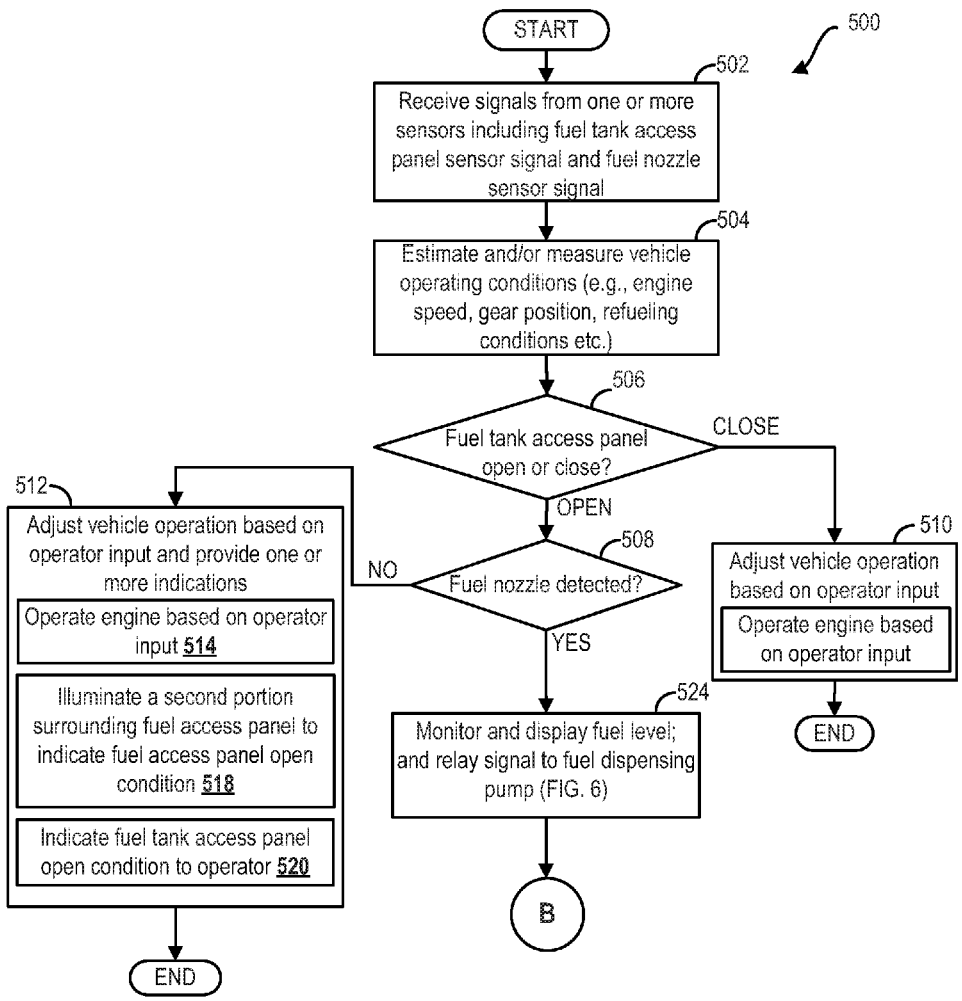
FIG. 5A shows a flow chart illustrating an example method for adjusting vehicle operation and illuminating a portion of the fuel tank access panel based on sensor signals form the fuel tank access region sensor sub system.
Figure 5B:
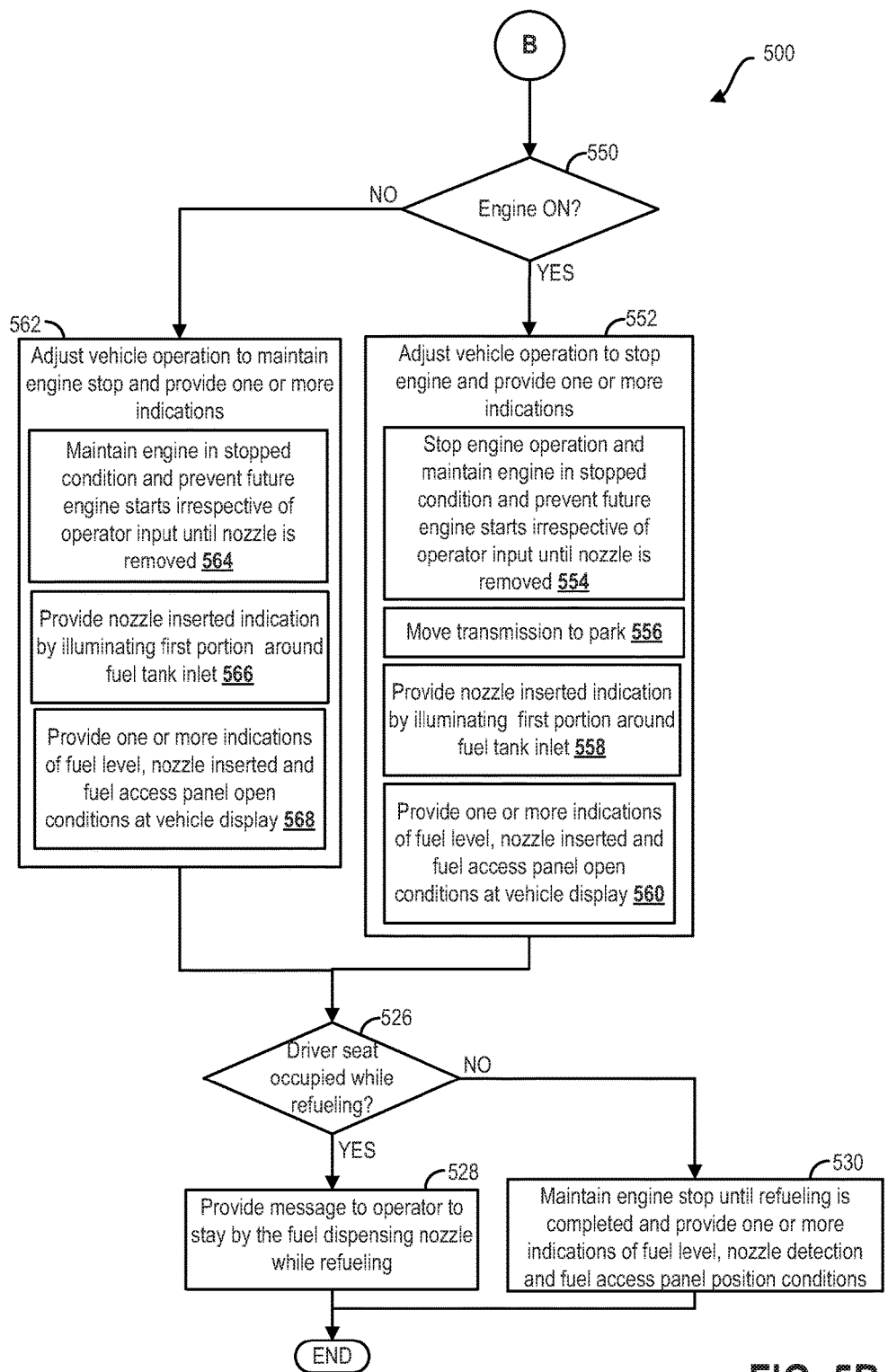
FIG. 5B is a continuation of FIG. 5A.
Figure 6:
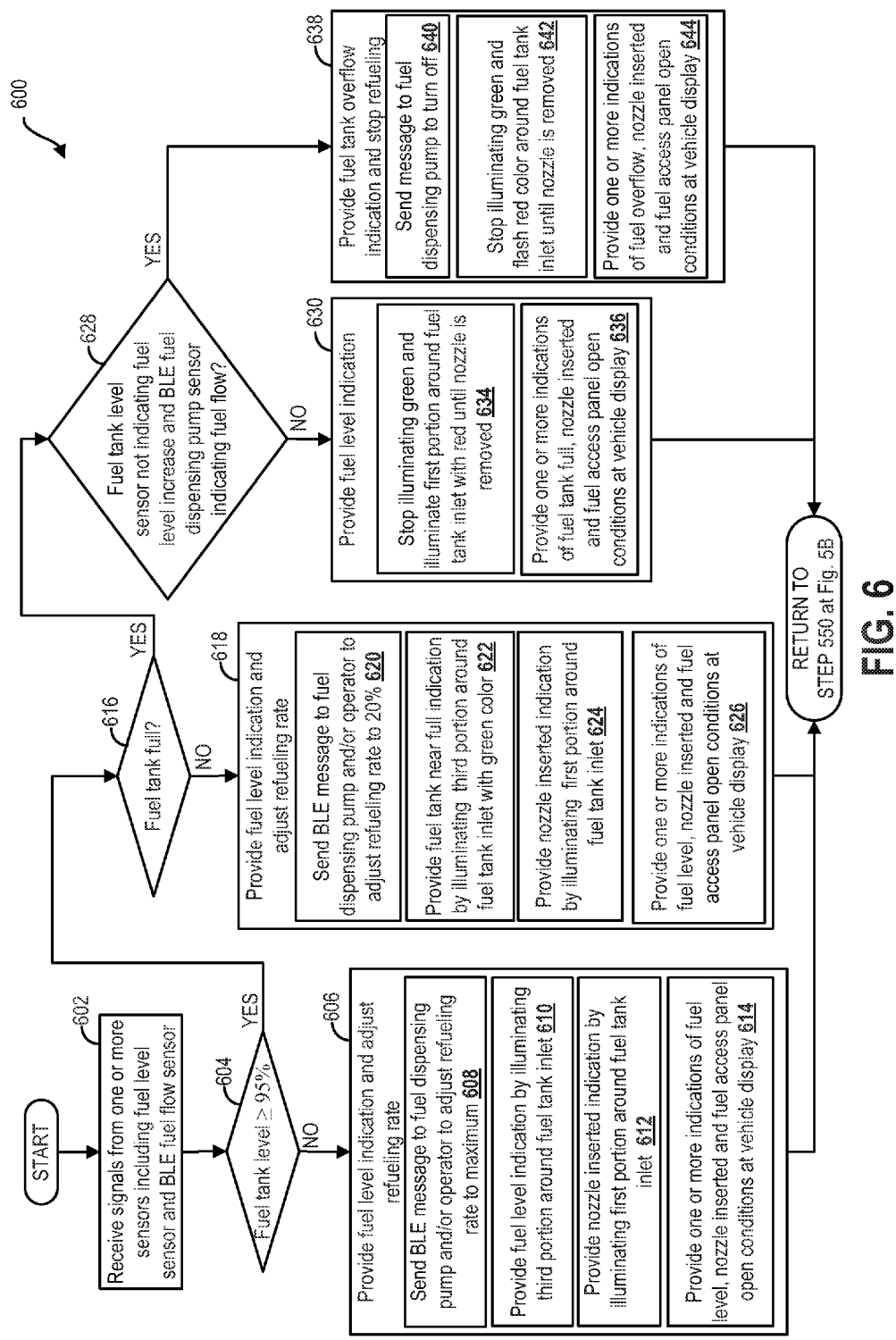
FIG. 6 shows a flowchart illustrating an example method for illuminating a portion of the fuel tank access panel and adjusting a refueling operation based on the sensor signals form the fuel tank access region sensor sub system, to be used in conjunction with the method of FIG. 5A.

Details of detecting and illuminating with the lighting and sensor system will be further elaborated with respect to FIGS. 5A, 5B, and 6. Details of the lighting system and illumination when the fuel tank access panel in a closed position in response to a fuel level will be further described with respect to FIG. 3A. Details of the lighting system and illumination when the fuel tank access panel in an open will be further described with respect to FIG. 3B.

Further, in some examples, additionally, the lighting system may be configured to illuminate a third portion of the fuel tank access region surrounding the fuel tank inlet in response to a fuel level within the tank. In one example, the third portion may include an area around a perimeter of the first portion. It will be appreciated that examples where the third portion is an area immediately surrounding the fuel tank inlet and the first portion is an area immediately surrounding the perimeter of the first portion are also within the scope of this disclosure.

In some embodiments, fuel tank 143 may be configured to store the fuel received from fuel dispensing device 170 until it is supplied to engine 110 for combustion. In some embodiments, control system 190 may receive an indication of the level of fuel stored at fuel tank 143 via a fuel level sensor. The level of fuel stored at fuel tank 143 (e.g., as identified by the fuel level sensor) may be communicated to the vehicle operator, for example, via a fuel gauge or indication in a vehicle instrument panel 196. Additionally, in some embodiments, as mentioned above, the third portion of the fuel tank access region may be illuminated based on the fuel tank level to provide a visual indication of the fuel level to an operator or user during a refueling operation.

energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. For example, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 111 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

The vehicle propulsion system 100 may also include an ambient temperature/humidity sensor 198, and sensors dedicated to indicating the occupancy-state of the vehicle, for example seat load cells 107, door sensing technology 108, and onboard cameras 109. In some examples, sensors dedicated to indicating occupancy-state of the vehicle may include including one or more of a thermal imaging system including an infra-red camera, and a seat sensing system including one or more seat pressure sensors coupled to each vehicle seat. Vehicle propulsion system 100 may also include inertial sensors 199. Inertial sensors may comprise one or more of the following: longitudinal, latitudinal, vertical, yaw, roll, and pitch sensors. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Further, the control unit 190 may adjust vehicle operation based on one or more indications from the sensor subsystem. Adjusting vehicle operation may include adjusting illumination of one or more portions of the fuel tank access region to provide a visual indication of one or more of presence of fuel nozzle within fuel tank, a fuel tank access panel in open condition, and a fuel level. Further adjusting vehicle operation may include adjusting engine operation, which may include stopping engine operation by suspending fueling to the engine cylinders during refueling. The methods and systems described herein provide the technical result of detecting at least a fuel dispensing nozzle attached to the fuel tank, and indicating the fuel dispensing nozzle attached condition to a vehicle operator or user by at least illuminating one or more portions of a fuel tank access region within the vehicle. The methods and systems described herein further provide the technical result of detecting at least a fuel tank access panel in an open condition, and indicating the open condition to a vehicle operator or user by at least illuminating one or more portions of a fuel tank access region within the vehicle.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system. Vehicle system 206 may be similar to vehicle system 100 shown in FIG. 1. Thus, fuel system 218 may be similar to fuel system 140 shown in FIG. 1.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel systems.

Vapors generated in fuel system 218 may be routed to an evaporative emissions control system 251 which includes a fuel vapor canister 222 via vapor recovery line 231, before being purge to the engine intake 223. Vapor recovery line may be coupled to fuel tank 220 via one or more conduits and may include one or more valves for isolating the fuel tank during certain conditions. For example, vapor recovery line 231 may be coupled to fuel tank 220 via one or more of a combination of conduits 271, 273, and 275.

Further, in some examples, one or more fuel tank vent valves may be included in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system 219 may include a refueling access seal 205 for sealing off the fuel filler system from the atmosphere. Refueling system 219 is coupled to fuel tank 220 via a fuel fill line or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the refueling access seal 205 may be configured as a fuel cap, and may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel fill line 211. In such embodiments, refueling lock 245 may not prevent the removal of a fuel cap. Rather, refueling lock 245 may prevent the insertion of a refueling pump into fuel fill line 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door may be electrically locked, for example by a solenoid, or mechanically locked, for example by a pressure diaphragm. In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

In some embodiments, refueling system 219 may be a capless design. In such embodiments, refueling access seal 205 may be considered a fuel tank inlet located in the body panel of the vehicle and refueling lock 245 may lock the fuel tank inlet. Refueling lock 245 may operate as described in the above examples. During refueling, a fuel dispensing nozzle may be inserted into a filler pipe via the fuel tank inlet. Further, as shown in FIGS. 3A and 3B, the fuel tank inlet may be shielded from the environment by a fuel tank access panel. The fuel tank access panel may be opened or closed about a hinge coupled to the vehicle chassis. The presence of fuel dispensing nozzle within the fuel tank (more particularly, the presence of the fuel dispensing nozzle within the fuel filler pipe of the fuel tank) may be detected via a sensor sub-system including a transmitter and a first receiver positioned on opposite sides of the fuel tank inlet. Details of the sensor sub-system, and detecting the presence of the fuel dispensing nozzle coupled to the fuel tank will be further elaborated with respect to FIGS. 3A and 3B. Further, the sensor sub-system may include a second receiver that may be used to detect an open or closed position of the fuel tank access panel. Particularly, the sensor sub-system may be configured to detect the fuel dispensing nozzle within the fuel tank while detecting the open/closed position of the fuel tank access panel. Details of detecting with the sensor sub-system will be further elaborated below with respect to FIGS. 3A, 3B, 4, 5A, 5B, and 6.

Further, while the detection of the fuel dispensing nozzle and fuel tank access panel position with the sensor sub-system is discussed herein with respect to a capless refueling system, it will be appreciated that the sensor sub-system may be implemented in fuel systems with different refueling lock mechanisms discussed above.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake 244 is provided to the fuel vapor canister for purging. In some examples, vent line 227 may include an air filter 259 disposed therein upstream of a canister 222.

Flow of air and vapors between canister 222 and the atmosphere may be regulated by a canister vent valve 229. Canister vent valve 229 may be a normally open valve, so that fuel tank isolation valve (FTIV) 252 may control venting of fuel tank 220 with the atmosphere. FTIV 252 may be a normally closed valve that when opened allows for the venting of fuel vapors from fuel tank 220 to canister 222. Fuel vapors may then be vented to atmosphere via canister vent valve 229, or purged to engine intake system 223 via canister purge valve 261.

Fuel system 218 and emission control system 251 are linked by FTIV 252. FTIV 252 may be coupled between fuel tank 220 and canister 222 within conduit 276. FTIV 252 may be actuated during engine-on conditions to decrease the pressure in fuel tank 220 by venting fuel vapor to canister 222. During refueling events, FTIV 252 may be utilized to decrease the pressure in fuel tank 220 to a threshold. FTIV 252 may be positioned between the fuel system and the evaporative emissions system, the FTIV 252 configured to isolate the fuel tank from the purge when closed. FTIV 252 may be configured to isolate the fuel tank 220 from the evaporative emissions system when closed, such that no other valve may be opened to fluidly couple the fuel system to the evaporative emissions system. FTIV 252 may be configured to isolate the fuel system from the evaporative emissions system when closed and further configured to partially open during fuel tank purging conditions and configured to completely open during refueling conditions. FTIV 252 may be further configured to isolate refueling vapors from diurnal vapors while closed.

The vehicle system 206 may further include a control system 214. Control system 214 may be similar to control system 190 discussed with respect to FIG. 1. Control system 214 is shown receiving information from a plurality of sensors 216 (various examples of which are described herein). As one example, sensors 216 may include exhaust gas sensor 237 located upstream of the emission control device, temperature sensor 233, pressure sensor 291, and canister temperature sensor 243. Further sensors 216 may include components of the sensor sub-system discussed herein with respect to detecting fuel dispensing nozzle and fuel tank access panel positions. These may include a transmitter, such as a infrared transmitter; a first receiver, such as a first infrared receiver configured and positioned to receive a portion of light from the transmitter; a second receiver, such as a second infrared receiver configured and positioned to receive a second portion of light (delivered at right angles from the portion of light) from the transmitter. Other sensors such as pressure, temperature, air/fuel ratio, and composition sensors may be coupled to various locations in the vehicle system 206. As another example, the actuators may include fuel injector 266, throttle 262, fuel tank isolation valve 252, pump 292, and refueling lock 245. The control system 214 may include a controller 212. The controller may receive input data from the various sensors, process the input data, and trigger the actuators in response to the processed input data based on instruction or code programmed therein corresponding to one or more routines. In one example, the controller may receive input data from the sensor sub-system, process the input data, and trigger a lighting system actuator in order to illuminate one or more portions of a fuel tank access region including the fuel tank access panel. Details of illuminating the one or more portions of the fuel tank access region will be elaborated with respect to FIGS. 3A, 3B, 4, 5A, 5B, and 6. Further, the controller may adjust vehicle operation based on the data from the sensor sub-system. Control system 214 may be configured with instructions stored in non-transitory memory that cause controller 212 to perform control routines via one or more actuators 281 based on information received via one or more sensors 216. Example control routines are described herein and with regards to FIGS. 5A, 5B, and 6.

Turning to FIG. 3A, it shows a schematic representation of a vehicle 300 including a fuel tank access panel 302 in a closed position. Vehicle 300 may be similar to vehicle propulsion system 100 discussed at FIG. 1 and vehicle system 208 discussed with respect to FIG. 2. Vehicle 300 includes a fuel tank access region 301. Fuel tank access region 301 may include a sensor sub-system that is configured to detect presence of a fuel dispensing nozzle, such as nozzle 170 at FIG. 1, within a fuel tank inlet included within vehicle 300. The fuel dispensing nozzle may be coupled to a fuel dispensing pump external to the vehicle. The fuel tank inlet may be located on a body panel of the vehicle and may function as an entrance to access the fuel tank during refueling operations. The fuel tank inlet may be shielded from the environment with a fuel tank access panel 302 included in the fuel tank access region 301. Fuel tank access panel 302 may be opened and closed about a hinge in order to access the fuel tank inlet.

Responsive to detecting the nozzle within the fuel tank inlet, and while the nozzle is within the fuel tank inlet, a vehicle controller, such as controller 212 or controller 191 discussed with respect FIGS. 2 and 1 respectively, may illuminate one or more portions of the fuel tank access region 301. For example, responsive to detecting presence of the fuel dispensing nozzle within the fuel tank, the controller may illuminate a first portion surrounding the fuel tank inlet. In one example, the first portion may be an area immediately surrounding the fuel tank inlet. In another example, the first portion may be an area immediately surrounding a second portion, the second portion immediately surrounding the first portion. In yet another example, in addition to the first portion, an area 316 surrounding the fuel tank access panel 302 may be illuminated responsive to detecting the nozzle within the fuel tank inlet. Area 316 may be an area surrounding a perimeter of fuel tank access panel 302.

Further, the sensor sub-system may be configured to detect a position of the fuel tank access panel 302. Specifically, the sensor sub-system may detect an open or closed position of the fuel tank access panel. In response to detecting an open position of the fuel tank access panel 302, the controller may illuminate one or more portions of the fuel tank access region 301. In one example, area 316 may be illuminated when the fuel tank access panel 302 is in an open position. When the nozzle is inserted into the fuel tank inlet, fuel tank access panel 302 is in an open position. Thus, the first portion surrounding the fuel tank inlet and area 316 around the perimeter of fuel tank access panel 302 may be illuminated responsive to detecting the fuel nozzle within the fuel tank inlet and the fuel tank access panel in the open position. Illumination of one or more portions of the fuel tank access region 301 when fuel tank access panel 302 in an open position and/or when the fuel dispensing nozzle is within the fuel tank is discussed below with respect to FIG. 3B.

Turning to FIG. 3B, it shows fuel tank access panel 302 in an open position. Fuel tank access panel 302 may provide coverage to a fuel tank inlet 310. Fuel tank inlet 310 may be configured to receive a fuel nozzle during refueling. For example, during refueling, fuel nozzle may be inserted into a filler pipe of a fuel tank of vehicle 300 via fuel tank inlet 310.

As mentioned above, vehicle 300 includes fuel tank access region 301. Fuel tank access region 301 includes fuel tank access panel 302 and fuel tank inlet 310. Fuel tank access region further includes the sensor sub-system that is be configured to detect one or more of nozzle inserted condition and a fuel tank access panel position. Fuel tank access region 301 further includes a lighting sub-system that is configured to illuminate one or more portions of fuel tank access region 301 responsive to detecting the one or more of nozzle inserted condition and fuel tank access panel open condition. Specifically, the lighting sub-system may be configured to illuminate a first portion 314 of fuel tank access region 301 around a perimeter of fuel tank inlet 310 in order to indicate a nozzle inserted condition when a nozzle is inserted in to fuel tank inlet 310. Further, the lighting sub-system may be configured to illuminate a second portion 316 around a perimeter of fuel tank access panel 302 when fuel tank access panel 302 is in an open position. The open position may be any position other than a closed position. Furthermore, the lighting sub-system may be configured to illuminate a third portion 312 around a perimeter of inlet 310 in order to indicate a fuel level within the fuel tank when fuel tank access panel 302 is in an open condition. While the present example shows the first portion 314 surrounding the third portion 312, it will be appreciated that examples where the third portion 312 surrounds the first portion is also within the scope of this disclosure.

The lighting sub-system includes a light source 305, a first photoluminescent portion, a second photoluminescent portion, and a third photoluminescent portion. The first, second, and third photoluminescent portions may be included within the first portion 314, the second portion 316, and the third portion 312 respectively. Further the first, second, and third photoluminescent portions may include materials with photochemical properties configured to convert a first wavelength of light from light source 305 to a second wavelength greater than the first wavelength. The second wavelength may comprise additional wavelengths including various combinations of wavelengths to emit light from the lighting sub-system.

In one example, light source 305 may be activated by the sensor sub-system. Specifically, light source 305 may be activated by the controller in response to one or more of detecting the fuel dispensing nozzle within fuel tank inlet 310, detecting fuel tank access panel 302 in an open position, and a fuel level. When activated, light source 305 may emit one or more selected wavelengths to illuminate one or more of the first, second, and third portions of the fuel tank access region 301 based on the detections.

In one example, as shown, light source 305 may be positioned adjacent to the first portion 314 and the second portion 316. The light source 305 may include one or more light emitting diodes (LEDS), for example. In some examples, additionally or alternatively, a second light source may be positioned within the first portion 314. Specifically, when positioned within the first portion, the second light source may include a plurality of LEDs arranged to form a light ring that may output wavelengths in the visible spectrum when activated. In this case, the second light source is self-illuminating and the light ring is illuminated when activated. Specifically, the second light source forming the light ring may be activated in response to detecting the presence of nozzle within the fuel tank access panel by the sensor sub-system including the transmitter and the first receiver.

Further, light source 305 and/or the second light source may include a coating or lens configured to shield and protect an exterior surface of the light sources from potentially corrosive materials and environmental conditions. In one example, the coating may be composed of silicone.

The sensor sub-system of the fuel tank access region 301 may include one or more sensors for detecting a fuel nozzle inserted condition and a fuel tank access panel open condition. Specifically, sensor system of the lighting and sensor system 301 may include a transmitter 306, a first receiver 308, and a second receiver 304. Transmitter 306 and first receiver 308 may be positioned on opposite sides of inlet 310 such that rays from the transmitter travel across fuel inlet 310 to reach first receiver 308. Thus, first receiver 308 may be positioned in an optical path of a first portion of light beam emitted by transmitter 306. Second receiver 304 may be positioned on an interior portion of fuel tank access panel 302. Second receiver 304 may be configured and positioned so as to receive a second portion of light beam delivered at right angles from the first beam from transmitter 306 when the fuel tank access panel 302 is in a closed position.

Transmitter 306 may be an infrared transmitter, and receivers 308 and 304 may be infrared receivers. During vehicle operation, transmitter 306 may continuously transmit infrared rays towards first receiver 308 and second receiver 304. Specifically, transmitter 306 may include a beam splitter which allows transmitter 306 to transmit a first portion of rays towards the first receiver 308, and transmit a remaining portion of rays at a right angle from the first portion. The first portion of rays may be detected by first receiver 308 when fuel nozzle is not inserted into the fuel tank. Upon sensing the first portion of rays, first receiver 308 may send a signal to a lighting controller indicating that fuel nozzle is not inserted within fuel tank inlet 310, and hence, portion 314 may not be illuminated. The remaining portion of rays may be received by second receiver 304 when fuel tank access panel 302 is in a closed position. Upon sensing the second remaining portion of rays, second receiver 304 may send a signal to the lighting controller indicating that fuel tank access panel 302 is in a closed position, and hence, portions 316 and/or 312 may not be illuminated.

When fuel nozzle is inserted within inlet 310, the first portion of infrared rays transmitted by transmitter may be blocked by the nozzle and hence, first receiver 308 may not receive the infrared rays, which may provide an indication to the lighting controller that the fuel nozzle is inserted within inlet 310. Responsive to the indication that the fuel nozzle is inserted within inlet 310, the lighting controller may send a signal to one or more light sources to illuminate portion 314 around fuel tank inlet 310. In one example, portion 314 may be illuminated by light source 305. In another example, portion 314 may be illuminated by a light path, such as a light ring, created by plurality of LEDs arranged within portion 314.

Further, when fuel tank access panel 302 is not closed, receiver 304 may not align in a straight line with transmitter 306, and hence, receiver 304 may not receive the second remaining portion of infra red rays transmitted by transmitter 306. Responsive to not sensing the remaining portion of infra red rays, sensor 304 may provide an indication to the lighting controller that the fuel tank access panel is in an open position. Responsive to the indication that the fuel tank access panel 302 is in an open condition, the lighting controller may send a signal to light source 305 to illuminate portion 316 around the perimeter of the fuel tank access panel 302.

Further, the indications of fuel nozzle inserted condition and fuel tank access door open conditions may be transmitted to a vehicle controller. Based on the indications, the vehicle controller may provide a visual indication via a vehicle display regarding the fuel nozzle inserted condition and fuel tank access door open conditions. Examples of signals received by a vehicle controller and a lighting controller, and corresponding actions taken by the vehicle controller and the lighting controller will be further elaborated with respect to FIG. 4.

Figure 4:
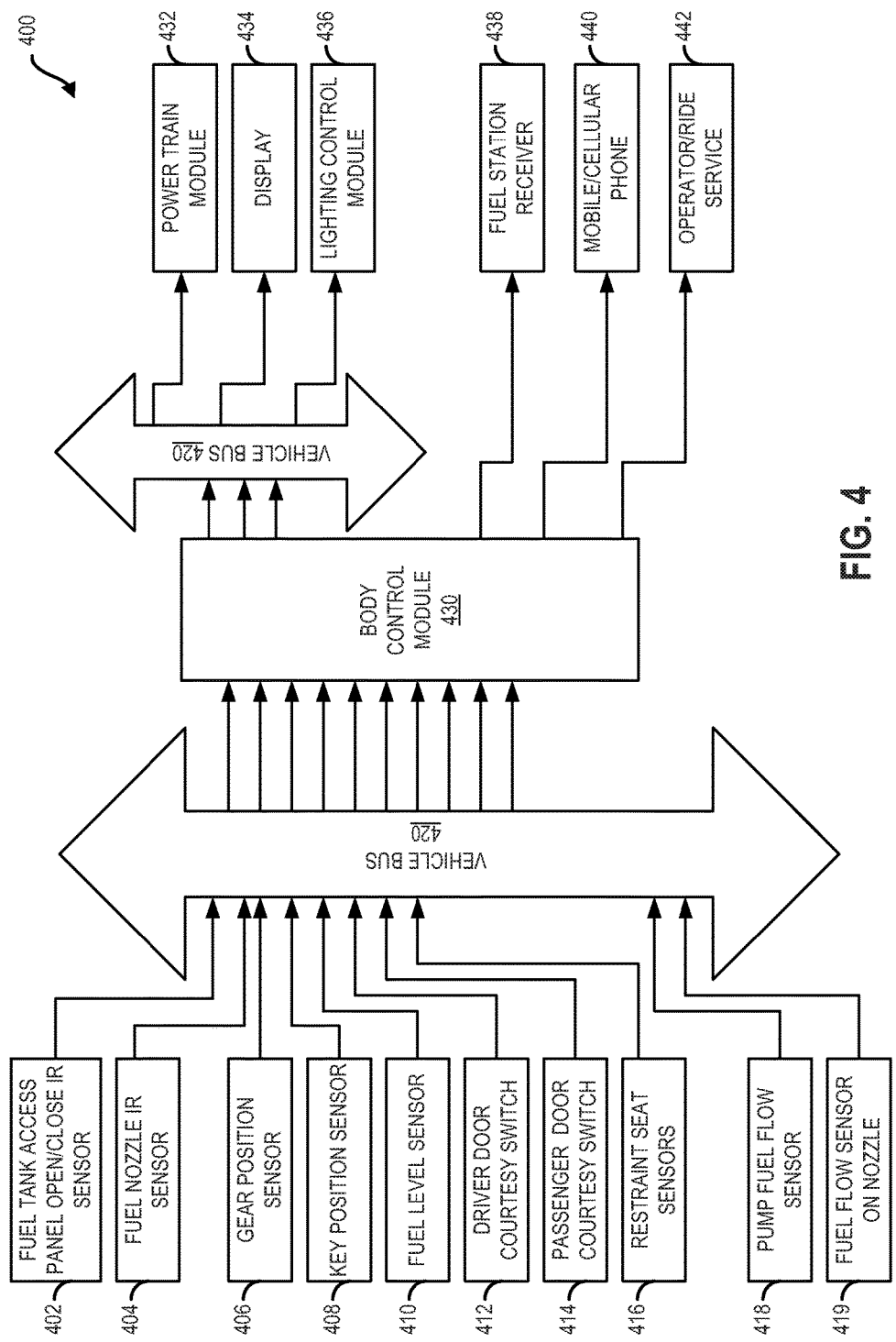
FIG. 4 shows a block diagram of a vehicle network including example input and output signals of the fuel tank access panel lighting and sensor sub-systems.

Next, FIG. 4 shows a block diagram of a portion of vehicle network 400 including a lighting control module for illuminating one or more portions of a vehicle, such as vehicle 300, and including a body control module for adjusting vehicle operation vehicle while providing indications, such as a status of a fuel system, based on signals received from one or more sensors. Vehicle network 400 includes a vehicle bus 420, which receives signals from a fuel tank access panel sensor 402, and fuel nozzle sensor 404. Fuel tank access panel sensor 402 and fuel nozzle sensor 404 may be included in the lighting and sensor sub-systems discussed at FIGS. 3A and 3B. Specifically, Fuel nozzle sensor 404 may include transmitter 306 and first receiver 308. Thus, fuel nozzle sensor 404 may detect presence of a fuel nozzle when the fuel nozzle is inserted into fuel tank inlet 310. Fuel tank access panel sensor 402 may include transmitter 306 and second receiver 308. Thus, fuel tank access panel sensor 402 may detect whether fuel tank access panel 302 is in an open condition or closed condition. Signals from fuel tank access panel sensor 402 and fuel nozzle sensor 404 may be communicated to body control module 430 via vehicle bus 420. Vehicle bus 420 may also receive signals from a gear position sensor 406, a key position sensor 408, a fuel level sensor 410, a driver door sensor 412, a passenger door sensor 414, a seat restraint sensor 416, a pump fuel flow sensor 418, and a fuel flow sensor on nozzle. These signals may be communicated to body control module 430 via vehicle bus 420. The body control module 430 may communicate with a power train module 432 via vehicle bus 420 to adjust vehicle operation based on the received signals. Further, body control module 430 may communicate with a vehicle display 434 to indicate one or more vehicle conditions based on the received signals. Further, body control module 430 may communicate with lighting control module 438 to illuminate one or more portions of the vehicle based on the received signals. Further, body control module 430 may communicate with one or more of a fuel station receiver 438, a mobile phone 440, and an operator/ride service 442 via a wireless communication, such as Bluetooth low energy communication to provide one or more indications to a vehicle operator based on the received signals. Details of adjusting vehicle operation and illuminating one or more portions of the vehicle based on the signals received from the sensors indicated above will be elaborated with respect to FIGS. 5A, 5B, and 6.

Turning to FIG. 5A, it shows a flow chart illustrating an example method 500 for detecting a fuel nozzle inserted in to a fuel tank and adjusting vehicle operation and providing one or more indications to a user responsive to the fuel nozzle within the fuel tank. Instructions for carrying out method 500 and other methods included herein may be executed by a controller of the vehicle system, such as controller 191 and 212 at FIGS. 1 and 2, based on instructions stored in non-transitory memory of the controller, and in conjunction with signals received from sensors of the vehicle system, such as the sensors described above with reference to FIGS. 1, 2, 3A, 3B, and 4. In one example, the controller may be included in a body control module of a vehicle, such as body control module 430, at FIG. 4. The controller may employ actuators of the vehicle system, such as the actuators described with reference to FIGS. 1, 2, 3A, 3B, and 4 to adjust vehicle operation and illuminate one or more portions of the vehicle based on fuel system operating conditions, such as fuel tank access door open/close condition, fuel nozzle inserted condition, etc., according to the methods described below.

Method 500 begins at 502. At 502, method 500 includes receiving signals from one or more sensors coupled to a vehicle, such as vehicle 300 at FIGS. 3A and 3B. The one or more sensors may include a fuel tank access panel sensor, a fuel nozzle sensor, a gear position sensor, a key position sensor, a fuel level sensor, a driver door sensor, a passenger door sensor, a seat restraint sensor, and a pump fuel flow sensor. The fuel nozzle sensor includes a transmitter, such as transmitter 306, and a first receiver, such as receiver 308. The fuel tank access panel sensor includes the transmitter and a second receiver, such as receiver 304. The gear position sensor may be coupled to a transmission of a vehicle, such as vehicle 300 at FIG. 3A. The gear position sensor may indicate a specific gear ratio that has been selected in the transmission by the vehicle operator or controller. The key position sensor may detect a position of a vehicle key, such as a key-on condition. Thus, the key position sensor may be used to detect if the engine is on. The fuel level sensor may be positioned within a fuel tank, such as a fuel tank 143 within vehicle system 100 at FIG. 1. The driver door sensor may be coupled to a driver side door of a vehicle, such as vehicle 300 at FIG. 3A. The driver door sensor may detect open/close position of the driver side door. The passenger door sensor may be coupled to a passenger side door of the vehicle, and may detect open/close position of the passenger side door. Further, each passenger side door may include a passenger door sensor. The seat sensor may be coupled to a driver seat within the vehicle and may detect presence or absence of the vehicle operator in the vehicle. Further, a pump fuel flow sensor from an external fuel dispensing pump may provide an indication of fuel flow rate from the fuel dispensing pump during a refueling operation. The indication may be communicated to the vehicle controller via wireless communication, such as BLE. During vehicle operation, the controller may receive signals from one or more sensors discussed above, via one or more of a vehicle bus and wireless communication.

Next, method 500 proceeds to 504. At 504, method 500 includes estimating and/or measuring vehicle operating conditions. Specifically, the vehicle operating conditions may be estimated and/or measured based on the signals received from the one or more sensors discussed at 502. Further, the vehicle operating conditions may include engine operating conditions, and fuel tank operating conditions. Engine operating conditions may include an engine on or off condition, engine speed, gear position, etc. Further, fuel tank operating conditions may include a fuel level, a refueling condition, presence or absence of fuel nozzle inserted into the fuel tank, an open or closed condition of the fuel tank access panel, and fuel flow from the fuel dispensing pump, etc. Further, vehicle operating conditions may include presence or absence of the vehicle operator, open or close condition of each of one or more of a driver side door and one or more passenger side doors.

Upon estimating and/or measuring vehicle operating conditions, method 500 proceeds to 506. At 506, method 500 includes determining if the fuel tank access panel is in open or closed. A position of the fuel tank access panel may be determined based on a signal from the fuel tank access panel sensor. For example, when the fuel tank access panel is in the closed position, the second receiver may be aligned with the transmitter in such a way that the second receiver may receive infra red rays from the transmitter. Upon receiving the infra red rays from the transmitter, the receiver may send a signal to the controller indicating that the fuel tank access panel is in the closed position. When the fuel tank access panel is in the open position (open position may be any position where the fuel tank access panel is not closed), the second receiver may not be aligned with the transmitter, and thus may not receive the infra red rays transmitted by the transmitter. In response to not sensing the infra red rays from the transmitter, the second receiver may send a signal to the controller indicating that the fuel tank access panel is in a closed position.

If it is determined that the fuel tank access panel is in the closed position, method 500 proceeds to 510. At 510, method 500 includes adjusting vehicle operation based on operator input, which may include adjusting engine operation based on operator input. For example, operator input may be determined based on one or more of accelerator pedal position, and brake pedal position. In one example, a desired engine torque may be determined based on the operator input, and engine may be operated, for example, with fueling, to provide the desired torque output. Method 500 may subsequently end.

If it is determined that the fuel tank access panel is in the open position, method 500 proceeds to 508. At 508, method 500 includes determining if the fuel nozzle is detected within the fuel tank inlet. The presence or absence of the fuel nozzle within the fuel tank inlet may be determined based on a signal from the fuel nozzle sensor. For example, when the fuel nozzle is within the fuel tank inlet, infra red rays from the transmitter are interrupted by the fuel nozzle, and thus may not reach the first receiver positioned on an opposite side of the fuel inlet. In response to not receiving the infra red rays from the transmitter, the first receiver may send a signal to the controller indicating that the fuel nozzle is present within the fuel tank inlet. When the fuel nozzle is not within the fuel tank inlet, infra red rays from the transmitter are received by the first receiver. In response to receiving the infra red rays from the transmitter, the first receiver may send a signal to the controller indicating that the fuel nozzle is not present within the fuel tank inlet.

Thus, at 508, if it is confirmed that the fuel nozzle is not detected while the fuel tank access panel is opened, method 500 proceeds to 512. At 512, method 500 includes adjusting vehicle operation based on vehicle operator input, and providing one or more indications to a user and/or a vehicle operator. Specifically, method 500 includes, at 514, operating the engine based on operator input. Further, method 500 includes, at 518, illuminating a second portion of the vehicle, such as second portion 316 at FIG. 3B, around a perimeter of the fuel tank access panel to indicate that the fuel tank access panel is open. The second portion may include a second photoluminescent portion. The second photoluminescent portion may be configured to convert an excitation emission including a first wavelength of light from the light source to at least one output emission including a second wavelength of light, where the second wavelength is greater than the first wavelength. As a result, the second portion is illuminated by the light source and a visual effect of light radiating from the third portion is produced. The illumination of the second portion may provide a visual indication that the fuel tank access panel is in the open condition.

Further, method 500 includes, at 520, indicate the fuel tank access panel open condition to the operator. Indicating the fuel tank open condition includes displaying the fuel tank open condition via a display of a human-machine interface within the vehicle. The indication may be via one or more of a warning light or text or a graphic display. Indicating the fuel tank open condition further includes, sending a message to a mobile phone of the operator. The message to the mobile phone may be transmitted via a Bluetooth low energy connection between the vehicle controller and the mobile phone.

Returning to 508, if it is confirmed that the fuel nozzle is detected within the fuel tank inlet, method 500 proceeds to 524. At 524, method 500 includes monitoring and displaying fuel level and relaying signal indicating current refueling status based on fuel level within the tank to a fuel dispensing pump. For example, upon detecting fuel nozzle within the fuel tank inlet, the controller may determine that a refueling operation is in progress. Accordingly, the controller may monitor and display fuel level to the vehicle operator/user. Further, the controller may relay refueling operation status, such as a fuel level, to a fuel dispensing pump. Details of monitoring and displaying fuel level and relaying signal to the fuel dispensing pump will be further elaborated with respect to FIG. 6.

Turning to FIG. 6, it shows a flow chart illustrating an example method 600 for monitoring and displaying fuel level, providing one or more fuel tank indications, and interacting with a fuel dispensing pump. The one or more fuel tank conditions may include open or closed position of the fuel tank access panel, fuel nozzle inserted condition, and fuel level within the fuel tank.

Method begins at 602. At 602, method 600 includes receiving signals from one or more sensors, including a fuel level sensor and a fuel flow sensor from a fuel dispensing pump via wireless communication, such as Bluetooth low energy (BLE) communication. The fuel flow sensor may provide an indication of a rate of fuel flow from the fuel dispensing pump.

Next, method 600 proceeds to 604. At 604, method 600 includes determining if the fuel tank level is at or greater than 95%. For example, based on indications from the fuel level sensor within the fuel tank, the controller may judge if the fuel tank level is at or greater than 95% of the full fuel tank volume. If the answer is NO, fuel tank level is less than 95% of full volume and the method proceeds to 606. At 606, method 600 includes providing a fuel level indication to a user and adjusting a refueling rate. These include, at 608, sending a message via BLE to a fuel dispensing pump controller to adjust the refueling rate to maximum. Additionally or alternatively, controller may send a message via BLE to a mobile phone of an operator to adjust the refueling rate to maximum. Further, at 610, method 600 may provide fuel level indications based on the fuel level. In one example, a current fuel level indication may be provided by illuminating a perimeter around the fuel tank inlet, such as portion 312 at FIG. 3B, with specific colors for specific fuel level range. In some examples, fuel level indications may be provided by illuminating a perimeter around the fuel tank access panel. Further, at 612, method 600 may indicate the presence of fuel nozzle within the fuel tank inlet by illuminating a perimeter around the fuel tank inlet (that is, illuminating a first portion of the fuel tank access region). That is, method 600 includes, at 612, illuminating a portion of the vehicle around a perimeter of the fuel tank inlet to indicate that the fuel dispensing nozzle is engaged with the fuel tank. The first portion may be illuminated via a lighting system, such as lighting system discussed at FIGS. 3A and 3B. Illuminating the first portion may include illuminating a first photo luminescent portion, which may be configured to convert an excitation emission including a first wavelength of light from a light source, such as light source 305 at FIG. 3B, to at least one output emission including a second wavelength of light, where the second wavelength is greater than the first wavelength. An output from the light source may be adjusted via the controller. That is, an intensity and wavelength of the excitation emission may be adjusted via the controller. In one example, the controller may actuate the light source to output a first excitation wavelength. The first excitation wavelength may be in the ultra violet or near ultra violet range, for example. The second wavelength of light may be in the visible spectrum such that when the first portion is illuminated, the illumination is visible to a user or the vehicle operator when viewed from outside the vehicle. Thus, a visual effect of light radiating from the first portion is generated. In some examples, the at least one output emission may comprise a single wavelength and thus, the illumination may appear in a color corresponding the output emission. In some examples, at least one output emission may include multiple wavelengths that may cause the output emissions to appear as white light. In this way, the first portion may be illuminated to provide an indication that the fuel nozzle is coupled with the fuel tank to a viewer outside the vehicle.

Furthermore, at 614, the indications of fuel level, nozzle inserted condition, and fuel tank access panel open conditions may be displayed at a display of a human-machine interface within the vehicle. Additionally or alternatively, a BLE message including the above indications of fuel level, nozzle inserted condition, and fuel tank access panel open conditions may be transmitted to a mobile phone of a user/vehicle operator. Method 600 then returns to step 550 at FIG. 5B discussed below.

Returning t0 604, if the fuel tank level is greater or equal to 95%, method 600 proceeds to 616. At 616, method 616 includes determining if the fuel tank is full. If the answer is NO, then method 600 proceeds to 618. At 618, method 600 includes providing fuel level indication and adjusting refueling rate based on the fuel level. These include, at 620, sending a message to the fuel dispensing pump and/or a vehicle operator to adjust refueling rate to 20%. Further, at 622, a portion of the vehicle around a perimeter of the fuel tank inlet may be illuminated with green color (that is, output emission from the third photoluminescent portion may correspond to a green wavelength of light) to indicate that the full tank is nearly full.

Further, at 624, method 600 may indicate the presence of fuel nozzle within the fuel tank inlet by illuminating a perimeter around the fuel tank inlet as discussed above. Further, at 626, the indications of fuel level, nozzle inserted condition, and fuel tank access panel open conditions may be displayed at a display of a human-machine interface within the vehicle. Additionally or alternatively, a BLE message including the above indications of fuel level, nozzle inserted condition, and fuel tank access panel open conditions may be transmitted to a mobile phone of a user/vehicle operator. Method 600 then returns to step 550 at FIG. 5B discussed below.

Returning to 616, if the fuel tank is full, method 600 proceeds to 628. At 628, method 600 includes determining if the fuel level sensor is not indicating fuel level increase and if fuel flow sensor from the pump is indicating fuel flow from the fuel dispensing pump. If the fuel level in the fuel tank is not increasing and if there is no fuel flow from the dispensing pump, the fuel tank is full and the refueling operation is completed. However, fuel nozzle is still present within the fuel tank inlet. Accordingly, at 630, method include providing appropriate fuel level indication and fuel tank condition indications. These include, at 634, stopping illuminating green and illuminating one or more of portions around the fuel tank inlet with red color until nozzle is removed (that is, output emissions from the third portion (for fuel level) and first portion (for nozzle present condition) around the fuel tank inlet may correspond to a red wavelength). Further, at 636, the indications of fuel level, nozzle inserted condition, and fuel tank access panel open conditions may be displayed at a display of a human-machine interface within the vehicle. Furthermore, a BLE message including the above indications of fuel level, nozzle inserted condition, and fuel tank access panel open conditions may be transmitted to a mobile phone of a user/vehicle operator.

Returning to 628, if the fuel tank is full and the fuel flow sensor from pump is indicating fuel flow, method 600 proceeds to 638. At 638, method 600 includes providing a fuel tank overflow indication and a message to stop refueling. These include, at 640, sending a message via BLE to a fuel dispensing pump controller to turn off the pump. Further, at 640, method 600 includes stopping illuminating green and illuminating one or more of portions around the fuel tank inlet with red color until nozzle is removed. Further, at 644, the indications of fuel overflow, nozzle inserted condition, and fuel tank access panel open conditions may be displayed at a display of a human-machine interface within the vehicle. Furthermore, a BLE message including the above indications of fuel level, nozzle inserted condition, and fuel tank access panel open conditions may be transmitted to a mobile phone of a user/vehicle operator. Method 600 then returns to step 550 at FIG. 5B.

Upon monitoring and displaying fuel level and relaying signals to fuel dispensing pump, method 500 proceeds to 550 at FIG. 5B. At 550, method 500 includes determining if the engine is ON. In one example, engine ON conditions may be determined based on one or more of an engine speed greater than a threshold, and a position of a vehicle key. For example, during the engine-on condition, the vehicle key may be inserted in the keyhole and at an "on" position. If the engine is ON, method 500 proceeds to 552.

At 552, method 500 includes adjusting vehicle operation to stop the engine, and further includes providing one or more indications. Specifically, at 554, method 500 includes stopping engine operation, maintaining the engine in the stopped condition, and preventing future engine starts irrespective of operator input until fuel nozzle is removed from the fuel tank inlet. Stopping the engine and maintaining the stopped condition may include ceasing fuel delivery (by commanding fuel injector actuators to disable fuel injection) and maintaining ceasing fuel delivery to the cylinders combusting air and fuel. Further, the engine may be maintained in the stopped condition without fuel delivery and combustion, irrespective of operator input (that is, irrespective of accelerator pedal position), until the fuel nozzle is determined to be removed.

Further, at 556, method 500 may include adjusting transmission to park position while the nozzle is within the fuel tank inlet. For example, if a gear position sensor indicates that transmission is not in a park position, the controller may adjust an actuator to shift the transmission to park from a current position.

Further, at 558, method 500 includes illuminating the first portion around a perimeter of the fuel tank inlet to indicate that the nozzle is inserted. In one example, the first portion may include a photoluminescent material and thus, may be illuminated as discussed at step 516 by illuminating the first portion via the light source. In another example, the first portion may include a light ring and the light ring be illuminated via one or more light emitting diodes arranged within the ring. For example, the one or more LEDs arranged within the ring may be configured to emit light rays of a specific wavelength (or multiple wavelengths) in the visual spectrum to illuminate the first portion and provide a visual indication (to an operator/user outside the vehicle) that the fuel nozzle is inserted within the fuel tank inlet. In the above example, the controller may send a signal to an actuator that causes the LEDs in the light ring to emit light rays in the visual spectrum. Thus, the light ring may illuminate a portion of the body of the vehicle around a perimeter of the fuel tank inlet. In this way, presence of fuel nozzle within the fuel tank inlet may be indicated to an operator/viewer outside the vehicle via a visual indication provided by illuminating a portion around the fuel tank inlet.

Next, at 560, method 500 includes providing one or more indications of fuel level, nozzle inserted condition, and fuel tank access panel open condition at the human-machine interface within the vehicle.

Returning to 550, if it is determined that the engine is not running, method 500 proceeds to 562. At 562, method 500 includes adjusting vehicle operation to maintain the engine stop condition, and providing one or more indications. This includes, at 564, maintaining the engine in the stopped condition and preventing future restarts as discussed above while the fuel nozzle is detected within the fuel tank inlet.

Further, at 566, the presence of the fuel nozzle within the fuel tank inlet is indicated to a viewer by illuminating a perimeter around the fuel tank inlet as discussed with respect to 558.

Further, at 567, method 500 includes providing one or more indications of fuel level, nozzle inserted condition, and fuel tank access panel open condition at the human-machine interface within the vehicle.

Next, method 500 proceeds to 526. At 526, method 500 includes determining if the driver seat is occupied during refueling. For example, the controller may determine if a driver door has opened based on a driver door sensor and if the vehicle operator leaves the driver seat based on a driver seat sensor and further, if all other doors remain closed. Subsequently, after it has been confirmed the driver has left the vehicle, the controller may monitor if the fuel dispensing nozzle is detected within fuel tank inlet. In some examples, it may be determined if the fuel dispensing nozzle is detected within a time threshold after the vehicle operator leaves the vehicle. If the fuel dispensing nozzle is detected, it may be confirmed that the vehicle operator has initiated a refueling event. During the refueling event, if the vehicle driver seat sensor indicates that the vehicle operator is present within the vehicle before the nozzle is removed, the controller may confirm that the vehicle operator who has initiated the refueling operation is inside the vehicle, responsive to which, at 528, the controller may send a message to a vehicle display. The message may indicate the vehicle operator to stay by the nozzle during refueling. In this way, the fuel dispensing nozzle sensor may be utilized for monitoring refueling operation in combination with one or more sensors such as a driver seat occupation sensor.

If the operator who has initiated the refueling operation is not present within the vehicle, method 500 proceeds to 530. At 530, method 500 includes maintaining the engine in stopped condition until refueling is completed, and providing indications of the fuel dispensing nozzle, fuel level, and fuel access panel positions as discussed above. Method 500 may subsequently end.

In this way, the fuel dispensing nozzle sensor in combination with one or more additional sensors, such as fuel tank access panel sensor, fuel level sensor, driver door sensor, and driver seat occupation sensor, may determine refueling conditions, and based on the refueling conditions, one or more portions of the fuel tank access region may be illuminated, and further, based on the refueling conditions, vehicle operations (in particular, engine operation) may be adjusted. The refueling conditions may include presence of fuel dispensing nozzle within the fuel tank inlet and fuel tank access panel open condition.

In accordance with the present disclosure, a vehicle method includes in response to detecting, with a transmitter and a first receiver of a sensor, a fuel dispensing nozzle within a vehicle fuel tank, illuminating a first portion of a fuel tank access region disposed in the vehicle; and in response to detecting, with the transmitter and a second receiver of the sensor, a fuel tank access panel in an open position, illuminating a second portion of the fuel tank access region. In a first example of the method, in response to detecting the fuel dispensing nozzle within the vehicle fuel tank, inhibiting engine start irrespective of operator input. A second example of the method optionally includes the first example and further includes wherein illuminating the first portion includes delivering a first wavelength of light from a light source, the light source located within the fuel tank access region adjacent to the first portion, to a photoluminescent portion of the first portion, the wavelength configured to excite the photoluminescent portion and cause the photoluminescent portion to output at least one emission wavelength in visible spectrum; and wherein illuminating the second portion includes delivering the first wavelength of light to a second photoluminescent portion of the second portion. A third example of the method optionally includes one or more of the first and second examples, and further includes wherein illuminating the first portion includes actuating a LED actuator, the LED actuator operating a plurality of light emitting diodes (LEDs) arranged within the first portion to output at least one wavelength of light in visible spectrum, and wherein the plurality of LEDs are arranged in a ring around the fuel tank inlet. A fourth example of the method optionally includes one or more of the first through third examples, and further includes wherein the first portion of the fuel access region is an area around a perimeter of a fuel tank inlet, the fuel tank inlet receiving the fuel dispensing nozzle; and wherein the second portion of the fuel access region is a second area around a perimeter of the fuel tank access panel. A fifth example of the method optionally includes one or more of the first through fourth examples, and further includes in response to detecting absence of fuel nozzle within the fuel tank, operating the engine based on operator input. A sixth example of the method optionally includes one or more of the first through fifth examples, and further includes, wherein the transmitter is an infra-red beam transmitter; and wherein the transmitter includes a beam splitter. A seventh example of the method optionally includes one or more of the first through sixth examples, and further includes that the first receiver is positioned in an optical path of a first beam produced by the transmitter; and wherein the second receiver is positioned in a second optical path of a second beam produced by the transmitter when the fuel door is in a closed position, the second beam delivered at a right angle from the first beam via the beam splitter. An eighth example of the method optionally includes one or more of the first through seventh examples, and further includes in response to detecting the fuel nozzle within the fuel tank and during an engine ON condition, stopping the engine. A ninth example of the method optionally includes one or more of the first through eighth examples, and further includes in response to detecting the fuel nozzle inserted within the fuel tank, detecting fuel tank level with a fuel level sensor within the fuel tank, determining fuel flow into the fuel tank based on indications from a fuel flow sensor disposed in a fuel dispensing pump external to the vehicle, and sending a message to the fuel dispensing pump to stop fuel flow responsive to detecting no increase in fuel tank level while continuous fuel flow from the fuel dispensing pump is indicated. A tenth example of the method optionally includes one or more of the first through ninth examples, and further includes, providing a message indicating fuel nozzle is attached to a vehicle operator via a display. An eleventh example of the method optionally includes one or more of the first through tenth examples, and further includes, in response to detecting the fuel dispensing nozzle within the fuel tank and detecting presence of an operator within the vehicle based on a driver seat sensor, providing a message to a vehicle operator, via a vehicle display, to stay by the nozzle.

Further, in accordance with the present disclosure, a method for a vehicle includes detecting a fuel dispensing nozzle coupled to a fuel tank inlet of a vehicle fuel tank while detecting a position of a fuel tank access panel via a sensor sub-system, the sensor sub-system including a transmitter, a first receiver, and a second receiver; adjusting illumination of a first portion of a fuel tank access region while adjusting illumination of a second portion of the fuel tank access region based on the detections; and adjusting vehicle operation based on the detection of the fuel dispensing nozzle. In a first example of the method, detecting the fuel dispensing nozzle via the transmitter and the first receiver, the transmitter and the first receiver positioned on opposite sides of the fuel tank inlet, and detecting the position of the fuel tank access panel via the transmitter and the second receiver, the second receiver positioned on an inner surface of the fuel tank access panel; wherein detecting the fuel dispensing nozzle includes sensing, at the first receiver, absence of a first portion of infrared beam transmitted by the transmitter; and wherein detecting the position fuel tank access panel includes detecting an open position of the fuel tank access panel by sensing, at the second receiver, absence of a second portion of infrared beam transmitted by the transmitter, the second portion of infrared beam transmitted at right angles to the first portion via a beam splitter. A second example of the method optionally includes the first example and further includes responsive to detecting the fuel dispensing nozzle coupled to the fuel tank and while the fuel dispensing nozzle is coupled to the fuel tank, stopping a vehicle engine and maintaining the engine in the stopped state irrespective of operator input; and responsive to not detecting the fuel dispensing nozzle, operating the vehicle engine based on the operator input. A third example of the method optionally includes one or more of the first and second examples, and further includes illuminating the first portion in response to detecting the fuel dispensing nozzle; and illuminating the second portion in response to detecting the open position of the fuel tank access panel; wherein the first portion is an area immediately surrounding a perimeter of the fuel tank inlet, and wherein the second portion is an area surrounding a perimeter of the fuel tank access panel. A fourth example of the method optionally includes one or more of the first through third examples, and further includes that in response to detecting the fuel dispensing nozzle and while the fuel dispensing nozzle is coupled to the fuel tank inlet, illuminating a third portion of the fuel tank access region based on a fuel level indication from a fuel level sensor coupled to the fuel tank.

Further, in accordance with the present disclosure a vehicle system includes a fuel tank including a fuel tank inlet for receiving a fuel dispensing nozzle; a fuel tank access region including a fuel tank access panel shielding the fuel tank inlet; a sensor sub system including a transmitter, a first receiver, and a second receiver; a lighting sub system including a light source, a first portion of the fuel tank access region including a photoluminescent portion, and a second portion of the fuel tank access region including a second photoluminescent portion; and a controller including instructions stored in non-transitory memory for: detecting the fuel dispensing nozzle coupled to the fuel tank via the fuel tank inlet based on indications from the first receiver while detecting an open position of the fuel tank access panel based on indications from the second receiver; illuminating the first portion in response to detecting the fuel dispensing nozzle; and illuminating the second portion in response to detecting the open position of the fuel tank access panel. In a first example of the vehicle system, the transmitter and the first receiver are each positioned on opposite sides of the fuel tank inlet such that a portion of light beam transmitted by the transmitter travels along a diameter of the fuel tank inlet before reaching the first receiver; and wherein the second receiver is positioned on an inner surface of the fuel tank access panel such that when the fuel tank access panel is in a closed position, a second portion of light beam from the transmitter is sensed by the second receiver, the second portion of light beam delivered at right angles from the first portion of the light beam.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
in response to detecting, with a transmitter and a first receiver of a sensor, a fuel dispensing nozzle within a vehicle fuel tank, illuminating a first portion of a fuel tank access region disposed in the vehicle; and in response to detecting, with the transmitter and a second receiver of the sensor, a fuel tank access panel in an open position, illuminating a second portion of the fuel tank access region.

2. The method of claim 1, further comprising, in response to detecting the fuel dispensing nozzle within the vehicle fuel tank, inhibiting engine start irrespective of operator input.

3. The method of claim 1, wherein illuminating the first portion includes delivering a first wavelength of light from a light source, the light source located within the fuel tank access region adjacent to the first portion, to a photoluminescent portion of the first portion, the wavelength configured to excite the photoluminescent portion and cause the photoluminescent portion to output at least one emission wavelength in the visible spectrum; and wherein illuminating the second portion includes delivering the first wavelength of light to a second photoluminescent portion of the second portion.

4. The method of claim 1, wherein illuminating the first portion includes actuating a LED actuator, the LED actuator operating a plurality of light emitting diodes (LEDs) arranged within the first portion to output at least one wavelength of light in the visible spectrum, and wherein the plurality of LEDs are arranged in a ring around a fuel tank inlet.

5. The method of claim 1, wherein the first portion of the fuel access region is an area around a perimeter of a fuel tank inlet, the fuel tank inlet receiving the fuel dispensing nozzle; and wherein the second portion of the fuel access region is a second area around a perimeter of the fuel tank access panel.

6. The method of claim 1, further comprising, in response to detecting absence of the fuel dispensing nozzle within the fuel tank, operating the vehicle based on operator input.

7. The method of claim 1, wherein the transmitter is an infra-red beam transmitter; and wherein the transmitter includes a beam splitter.

8. The method of claim 7, wherein the first receiver is positioned in an optical path of a first beam produced by the transmitter; and wherein the second receiver is positioned in a second optical path of a second beam produced by the transmitter when a fuel door is in a closed position, the second beam delivered at a right angle from the first beam via the beam splitter.

9. The method of claim 1, further comprising, in response to detecting the fuel dispensing nozzle within the fuel tank and during an engine ON condition, stopping an engine of the vehicle.

10. The method of claim 1, further comprising:
in response to detecting the fuel dispensing nozzle inserted within the fuel tank,
detecting a fuel tank level with a fuel level sensor within the fuel tank,
determining fuel flow into the fuel tank based on indications from a fuel flow sensor disposed in a fuel dispensing pump external to the vehicle, and
sending a message to the fuel dispensing pump to stop fuel flow responsive to detecting no increase in the fuel tank level while continuous fuel flow from the fuel dispensing pump is indicated.

11. The method of claim 1, further comprising, providing a message indicating the fuel dispensing nozzle is attached to a vehicle operator via a display.

12. The method of claim 1, further comprising, in response to detecting the fuel dispensing nozzle within the fuel tank and detecting a presence of an operator within the vehicle based on a driver seat sensor, providing a message to a vehicle operator, via a vehicle display, to stay by the fuel dispensing nozzle.

13. A method for a vehicle, comprising:
detecting a fuel dispensing nozzle coupled to a fuel tank inlet of a vehicle fuel tank while detecting a position of a fuel tank access panel via a sensor sub-system, the sensor sub-system including a transmitter, a first receiver, and a second receiver;
adjusting illumination of a first portion of a fuel tank access region while adjusting illumination of a second portion of the fuel tank access region based on the detections; and
adjusting vehicle operation based on the detection of the fuel dispensing nozzle.

14. The method of claim 13, further comprising detecting the fuel dispensing nozzle via the transmitter and the first receiver, the transmitter and the first receiver positioned on opposite sides of the fuel tank inlet, and detecting the position of the fuel tank access panel via the transmitter and the second receiver, the second receiver positioned on an inner surface of the fuel tank access panel; wherein detecting the fuel dispensing nozzle includes sensing, at the first receiver, absence of a first portion of an infrared beam transmitted by the transmitter; and wherein detecting the position of the fuel tank access panel includes detecting an open position of the fuel tank access panel by sensing, at the second receiver, absence of a second portion of the infrared beam transmitted by the transmitter, the second portion of the infrared beam transmitted at right angles to the first portion via a beam splitter.

15. The method of claim 13, further comprising, responsive to detecting the fuel dispensing nozzle coupled to the fuel tank and while the fuel dispensing nozzle is coupled to the fuel tank, stopping a vehicle engine and maintaining the engine in a stopped state irrespective of operator input; and responsive to not detecting the fuel dispensing nozzle, operating the vehicle engine based on the operator input.

16. The method of claim 14, further comprising illuminating the first portion in response to detecting the fuel dispensing nozzle; and illuminating the second portion in response to detecting the open position of the fuel tank access panel; wherein the first portion is an area immediately surrounding a perimeter of the fuel tank inlet, and wherein the second portion is an area surrounding a perimeter of the fuel tank access panel.

17. The method of claim 13, further comprising, in response to detecting the fuel dispensing nozzle and while the fuel dispensing nozzle is coupled to the fuel tank inlet, illuminating a third portion of the fuel tank access region based on a fuel level indication from a fuel level sensor coupled to the fuel tank.

18. The method of claim 13, further comprising, in response to detecting the fuel dispensing nozzle and detecting a presence of a vehicle operator inside the vehicle, displaying a message, via a vehicle display, to stay by the fuel dispensing nozzle, and transmitting the message to a mobile phone coupled via a wireless connection.

19. A vehicle system, comprising:
a fuel tank including a fuel tank inlet for receiving a fuel dispensing nozzle;
a fuel tank access region including a fuel tank access panel shielding the fuel tank inlet;
a sensor sub-system including a transmitter, a first receiver, and a second receiver;
a lighting sub-system including a light source, a first portion of the fuel tank access region including a photoluminescent portion, and a second portion of the fuel tank access region including a second photoluminescent portion; and
a controller including instructions stored in non-transitory memory for:
detecting the fuel dispensing nozzle coupled to the fuel tank via the fuel tank inlet based on indications from the first receiver while detecting an open position of the fuel tank access panel based on indications from the second receiver;
illuminating the first portion in response to detecting the fuel dispensing nozzle; and
illuminating the second portion in response to detecting the open position of the fuel tank access panel.

20. The system of claim 19, wherein the transmitter and the first receiver are each positioned on opposite sides of the fuel tank inlet such that a portion of a light beam transmitted by the transmitter travels along a diameter of the fuel tank inlet before reaching the first receiver; and wherein the second receiver is positioned on an inner surface of the fuel tank access panel such that when the fuel tank access panel is in a closed position, a second portion of the light beam from the transmitter is sensed by the second receiver, the second portion of the light beam delivered at right angles from the first portion of the light beam.

* * * * *